Oct. 2, 1956

L. S. HODGES 2,765,195

TRACTOR BORNE SPRAYING APPARATUS

Filed Nov. 20, 1953

INVENTOR.
LEONARD SINCLAIR HODGES.
BY
Carlson, Pitzner, Hubbard & Wolfe
ATTORNEYS.

Oct. 2, 1956  L. S. HODGES  2,765,195
TRACTOR BORNE SPRAYING APPARATUS
Filed Nov. 20, 1953  4 Sheets-Sheet 3

INVENTOR.
LEONARD SINCLAIR HODGES.
BY
Carlson, Pitzner, Hubbard & Wolfe
ATTORNEYS.

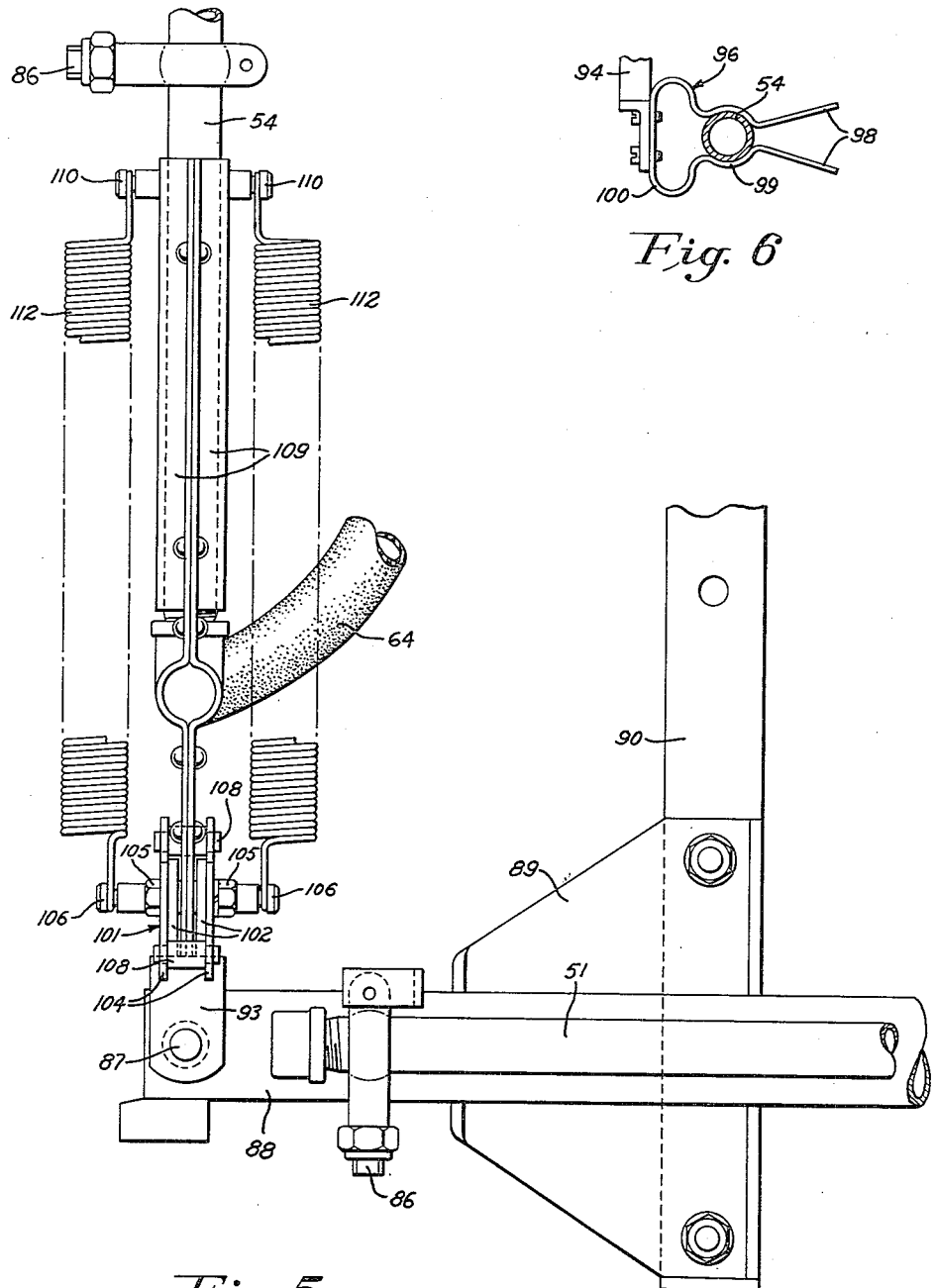

United States Patent Office 2,765,195
Patented Oct. 2, 1956

2,765,195

TRACTOR BORNE SPRAYING APPARATUS

Leonard S. Hodges, Leamington Spa, England, assignor to Massey-Harris-Ferguson (Sales) Limited, a British company Application November 20, 1953, Serial No. 393,477

Claims priority, application Great Britain November 20, 1952

7 Claims. (Cl. 299—30)

This invention relates in general to spraying apparatus and, more particularly, to such apparatus adapted to be carried by a tractor to spray insecticide or the like on crops as the tractor advances.

It is the general aim of the invention to provide improved spraying apparatus which is conveniently mounted and latched on the power elevatable draft links of a tractor, and easily controlled as to spraying operations and moving spray booms between stowed and laterally extending operative positions.

Another object is the provision of a liquid spray tank which is lifted from stored position on the ground by means of the tractor's draft links and latched in carried position to relieve the power hitch actuator from the weight of the tank.

A further object of the invention is to provide such spraying apparatus having a pump carried on the underside of the tank, together with an improved disengageable drive shaft for connecting the pump to be driven from the tractor's power take-off shaft. An ancillary object is the provision of the above mentioned latch means and the drive shaft in combination with means for preventing release of the latch and lowering of the tank as long as the drive shaft is connected. Damage to the drive shaft is thereby prevented.

It is another object to provide, in such spraying apparatus, spray booms pivoted to the tank in a manner to swing between vertical, stowed positions and laterally extending, horizontal spraying positions, a mechanism for raising and lowering the booms, and means for automatically closing or opening stop cocks in the boom supply lines when latter are moved to stowed or spraying positions, respectively.

Still another object of the invention is the provision of improved break-out means for permitting the spray booms to rock fore and aft of the tractor should they encounter an obstruction as the tractor is driven either forward or backward. Coincident with such provision, it is another object to provide releasable clip means for retaining the spray booms in vertical, stowed positions, such clip means facing rearwardly to let the booms "break" or swing should they encounter an obstruction as the tractor advances. Such breakout action assures that the tractor may be halted before damage is done to the booms or their mounting connections.

Other objects and advantages will become apparent as the following description proceeds, taken in conjunction with the accompanying drawings, in which:

Fig. 5 is an enlarged fragmentary rear elevation taken along the line 5—5 in Fig. 2 and detailing the connection of a spray boom to the tank; and Fig. 6 is a fragmentary plan view, partially in section along the line 6—6 in Fig. 2, illustrating a clip for retaining the swingable spray booms in stowed position.

While the invention has been illustrated and is described in some detail with reference to a particular embodiment thereof, there is no intention that it thus be limited to such detail. On the contrary, it is intended here to cover all alterations, modifications and equivalents falling within the spirit and scope of the invention as defined by the appended claims.

Tank structure and hitch mechanism

Figure 2:
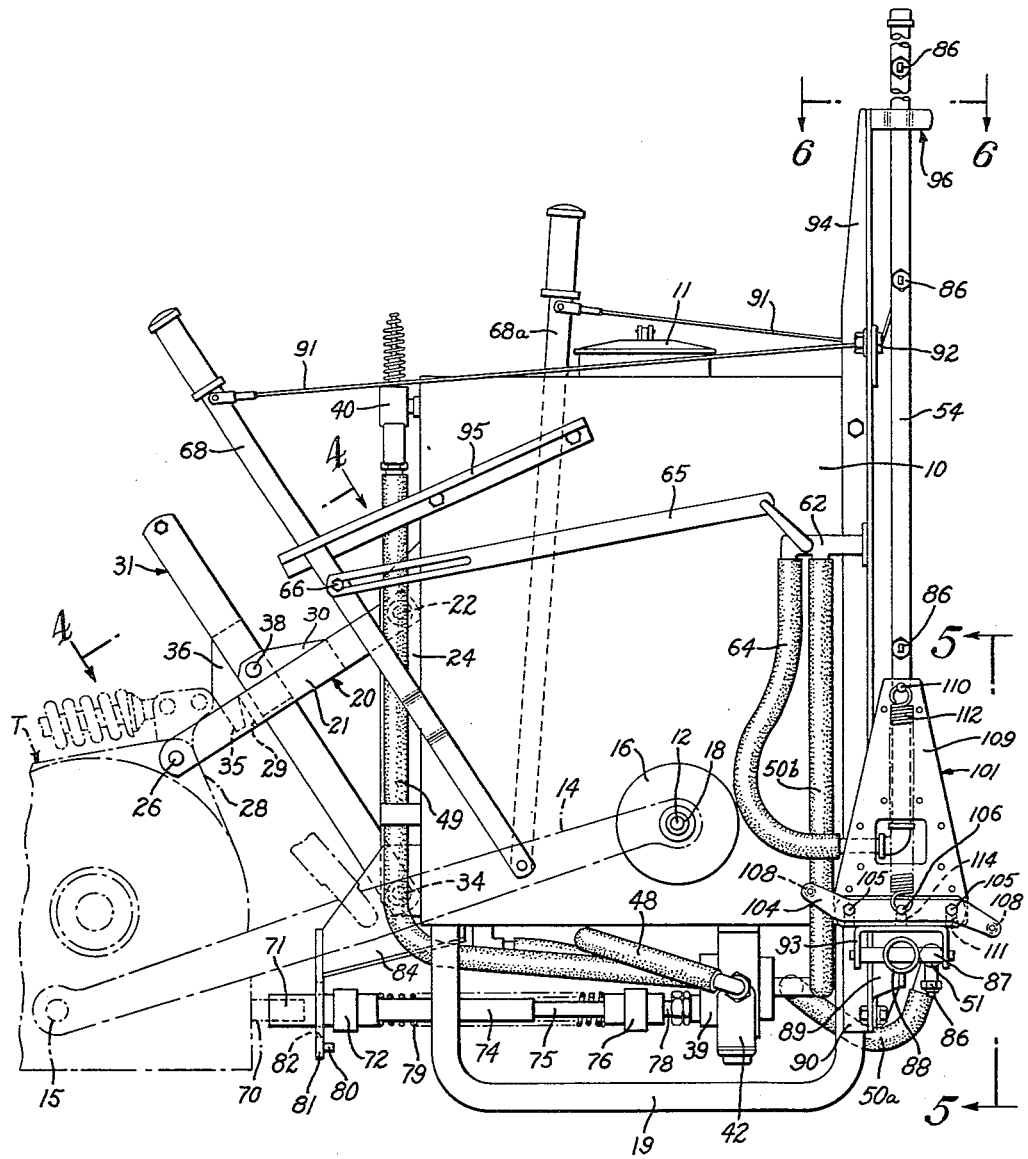
Fig. 2 is a side elevation of the apparatus shown in Fig. 1, illustrated in carried position on the rear hitch of a tractor, only a portion of the latter being shown.

Referring now to the exemplary embodiment of the invention here shown, the spraying apparatus comprises liquid storage means illustrated as a substantially rectangular tank 10 having a lid 11 and provided at each side with a hitch pin 12 adapted for connection to apertured universally mounted balls in the ends of lower hitch links or draft links 14 (Fig. 2). These draft links 14 extend rearwardly from universal pivot connections 15 at the rear of a tractor T, forming a part of a power actuated implement hitch, for example, of the type employed on the "Ferguson" tractor and familiar to those skilled in the art. The pins 12 pass through the side walls of the tank 10 and are welded internally. They also pass through dished supporting plates 16 which are welded peripherally to the tank side walls and to which are welded collars 18 on the pins. Each pin 12 is thus supported at substantially well spaced points, namely, at its inner end and at the collar 18. The construction, owing to the dished nature of the plate 16, is light.

At the bottom, the tank is provided with two tubular U-shaped stands 19 upon which it can be supported in spaced relation from the ground when not in use. When the tank is thus stored, the hitch pins 12 are at a convenient height for attachment to the lowered draft links 14. Moreover, these stands 19 enable the mounting underneath the tank of a power mechanism, such as the pump, and other elements of the apparatus to be described later.

Figure 4:
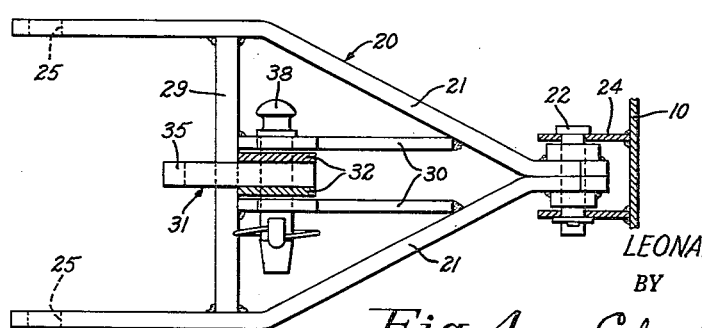
Fig. 4 is a detail plan view, looking along the line 4—4 in Fig. 2, of a top link employed in connecting the spray tank to the tractor.

The third point for the usual three point attachment to the tractor T is provided by a top link 20 which is formed of two arms 21 welded together and apertured at their aft ends and diverging forwardly to apertured front ends (Fig. 4). The aft end of the link 20 is pivoted to the front face of the tank 10 by a pin 22 inserted through a vertical channel 24 welded vertically along such front face. The link is adapted for pivotal connection to the rear of the tractor by the apertures 25 which receive a long hitch pin 26 usually provided on the tractor T. This long pin 26 does not actuate the well known mechanism for operating the automatic depth control, but is inserted through spaced lugs 28 on the tractor. As shown more clearly in Fig. 4 the link 20 is provided with a cross member 29 which forms a latch abutment and is also provided with spaced longitudinal bars 30 which form a latch guide.

As is well known, the hitch links 14 can be raised or lowered under control of the hydraulic power unit (not shown) of the tractor T but with substantially heavy apparatus, such as spraying apparatus, it is desirable that the hydraulic unit should be relieved of the load once the apparatus is raised; otherwise, unduly high hydraulic pressures might be caused due to bouncing or the like of the apparatus in transport. Such pressures would cause excessive stress on the system and undue actuation of the safety release valve. In view of this, latch means, here a mechanical latch mechanism, is provided which includes a latch bar 31 formed of parallel members 32. The latch bar 31 is pivoted at 34 to the channel member 24 and is provided with a central latch hook member 35 having an inclined ramp surface 36 (Fig. 2).

Fig. 2 shows the apparatus in the raised and latched position, the numerals 22 and 12 respectively denoting the pivot points of the upper and lower links to the tank 10. The hook member 35 is engaged over the latch abutment 29. As the pivot point at 34 is at a greater swing radius than the abutment 29 a lowering movement of the draft links 14 would entail a greater movement of pivot 34 than abutment 29. Consequently, the latch or check link 31 is placed in tension when the power lift on the draft links is terminated. The check link thus locks the tank in its elevated or transport position. Thus the tank is supported mechanically and the hydraulic unit is relieved of any load. This position of support leaves the draft links 14 below the topmost or normal transport position of the "Ferguson" tractor links, in which position the hydraulic unit is automatically put out of action. Thus the unit is still capable of providing hydraulic power for any other equipment should that be desired.

It will be seen from Fig. 2 that the pivot connections 15, 26, 22 and 12 between the links 14 and 20 are located at the corners of a quadrilateral, such that during raising of the tank 10 from rest on the stands 19, the tank 10 is moved substantially vertically and is not tipped from its upright position. That is, the fore and aft distance between the pivots at 22 and 12 is compensated for by a like fore and aft separation of the pivots at 15 and 26.

With the tank 10 thus latched in carried position, as described, it may be locked against "bouncing" upwardly by a locking pin 38 inserted through alined holes in the check link 31 and the bars 30 of the top link 21.

In order to lower the apparatus the lock pin 38 is first removed and the power unit is actuated to raise the draft links 14 so that the hook 35 rides above the abutment 29. Then the check link 31 can be manually rocked rearwardly to clear the hook 35 from the abutment 29 whereupon the draft links 14 can be lowered to set the tank down on the stands 19. When the apparatus is lifted from the lowered position, the inclined surface 36 causes the hook 35 to ride over the abutment 29 whereupon the check link 31 falls out by gravity so that the hook will automatically engage on slight lowering of the linkage, that is, the check link 31 acts as a gravity catch.

The hydraulic circuit and control of the apparatus may be substantially as set out in applicant's copending U. S. application Serial No. 392,405, filed November 16, 1953. For the purpose of the present application it is sufficient to note that the hydraulic system includes a power mechanism, here a gear type pump 39, mounted below the tank. There is also provided at the front of the tank a safety check and return valve 40. A main control valve 41 is also located under the tank together with a filter 42 and the pump 39, it being evident that the stands 19 conveniently enable the mounting of the above elements underneath the tank.

The hydraulic connections consist of a suction conduit 44 from the bottom of the tank to the main valve 41, a suction conduit 45 from the main valve to the suction side of the pump, a pressure or discharge conduit 46 from the pump connected to the filter 42 and connected by a conduit 48 to the main valve and also connected by a conduit 49 to the check valve 40. From the main valve 41 there also extends a conduit 50 leading to spray booms mounted on the tank 10, the branch 50a going to a central boom 51 and the branches 50b, 50c to the respective side booms 54 and 54a.

Figure 3:
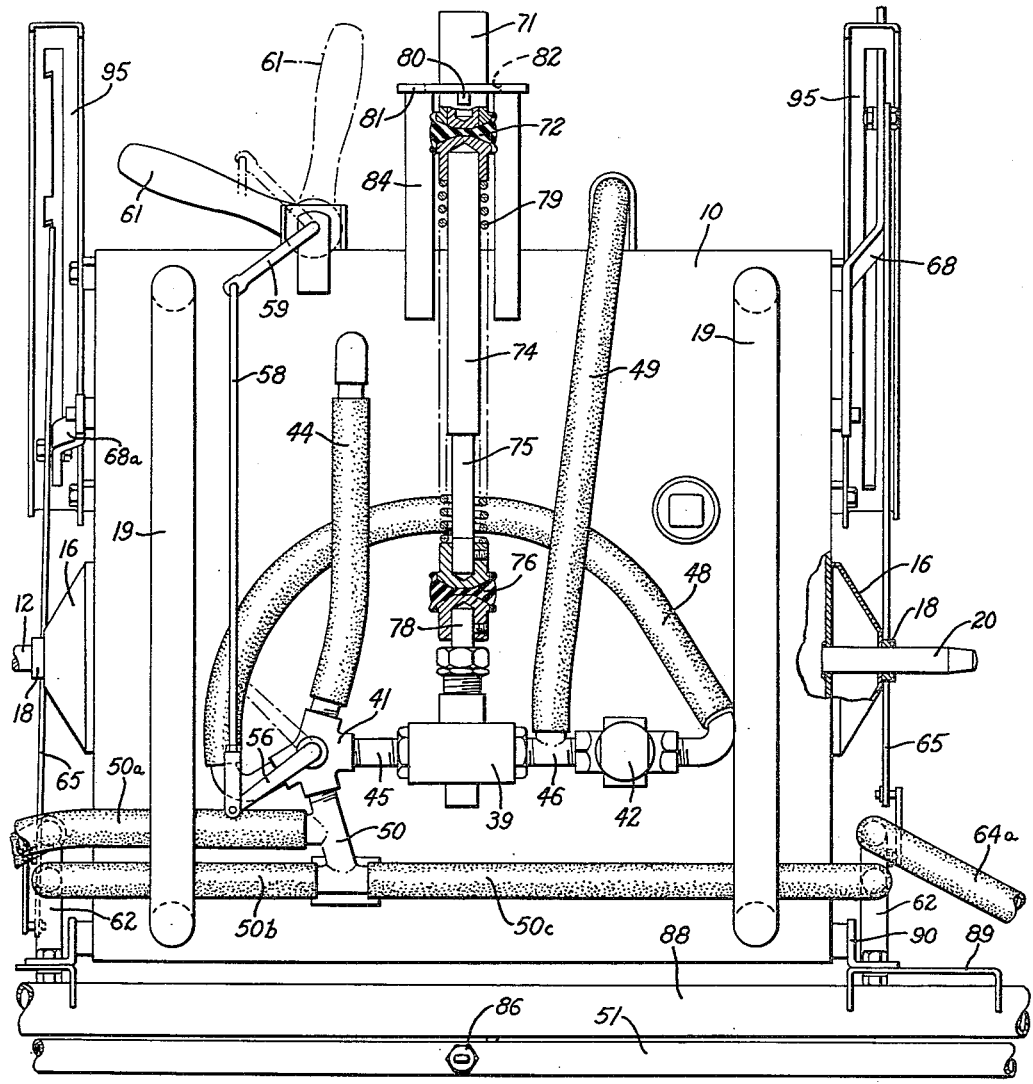
Fig. 3 is a bottom plan view of the spraying apparatus.

The main control valve 41 is a two-position valve as described in the above mentioned copending application and is controlled by a lever 56 connected by a link 58 to the cranked lower end 59 of a vertical shaft 60 having an operating handle 61 at the front of the tank convenient to the tractor operator. The two positions of the handle 61 are indicated in Fig. 3 and suitable stop means (not shown) are associated with the handle to define these positions.

There is a control cock 62 (Fig. 2) mounted at each side of the tank for each side boom 54 and 54a to which cock the conduits 50a and 50b lead and from which conduits 64 and 64a lead to the side booms 54 and 54a. The cocks 62 are controlled by links 65 having pin and slot lost-motion connections 66 with hand levers 68 and 68a forming part of a mechanism for lifting and lowering each side boom 54 and 54a. This coupling is such that the cock is automatically closed when the corresponding side boom is raised, as will appear more fully below.

*Power take-off pump drive*

The tractor T has a power take-off shaft 70 extending from the lower region of its rear housing. Drive coupling means are provided for taking drive from the power take-off shaft to the pump 39, comprising a telescopic shaft having two parts connected in axially slidable but non-rotatable relation, with spring means urging them to expand, one of the parts being axially recessed and biased into socketed fit with the power take-off shaft. In this instance a socket member 71 is adapted to be slipped axially onto the power take-off 70 in driving relation. The member 71 is connected by a bonded rubber flexible joint 72 (see Fig. 3) of known type to a square cross section hollow shaft element 74 which is adapted for telescopic driving engagement with a square shaft 75. This is connected by a bonded rubber flexible coupling 76 (Fig. 3) of known type to the pump drive shaft 78. A compression spring 79 acts between the telescopic shaft elements 74, 75, urging the coupling element 71 into socketed engagement with the power take-off shaft 70.

This drive shaft can be easily engaged and disengaged. To disengage the drive, the coupling element 71 is pressed backward against the action of the spring 79 to clear the power take-off shaft 70 and can be readily stowed in inoperative position by engaging it with a projection 80 provided on a guard plate 81 having an aperture 82 through which the coupling member 71 normally passes. The guard plate 81 is supported by a bracket 84 attached to the channel member 24 at the front of the tank (Fig. 3).

Owing to the substantial weight of the apparatus it is desirable that it should be mounted with the tank 10 as close as possible to the rear of the tractor. This enables a relatively short drive from the power take-off shaft 70 to the pump 39 although it renders impractical the provision of a coupling shaft sufficiently flexible to allow the drive to continue or the drive shaft to remain coupled throughout the vertical range of movement of the tank. Thus, the drive shaft in the present arrangement would be damaged if still working or in working position, i. e., socketed to the power take-off shaft, as the tank is lowered from the operative position. Therefore, in accordance with the invention, means is provided to prevent this by precluding release of the latch member 31 when the drive shaft or coupling is connected. In this instance the bottom edge of the aperture 82 is spaced so that on raising the tank from its latched position, the plate 81 engages the drive shaft or member 71 and prevents further lifting movement so that the latch hook 35 cannot clear the abutment 29. So long as the drive shaft is engaged the latch cannot be disengaged. It is necessary first to detach the coupling 71 and stow it on the projection 80 before the apparatus can be lowered.

*Spray boom mounting and control*

Figure 1:
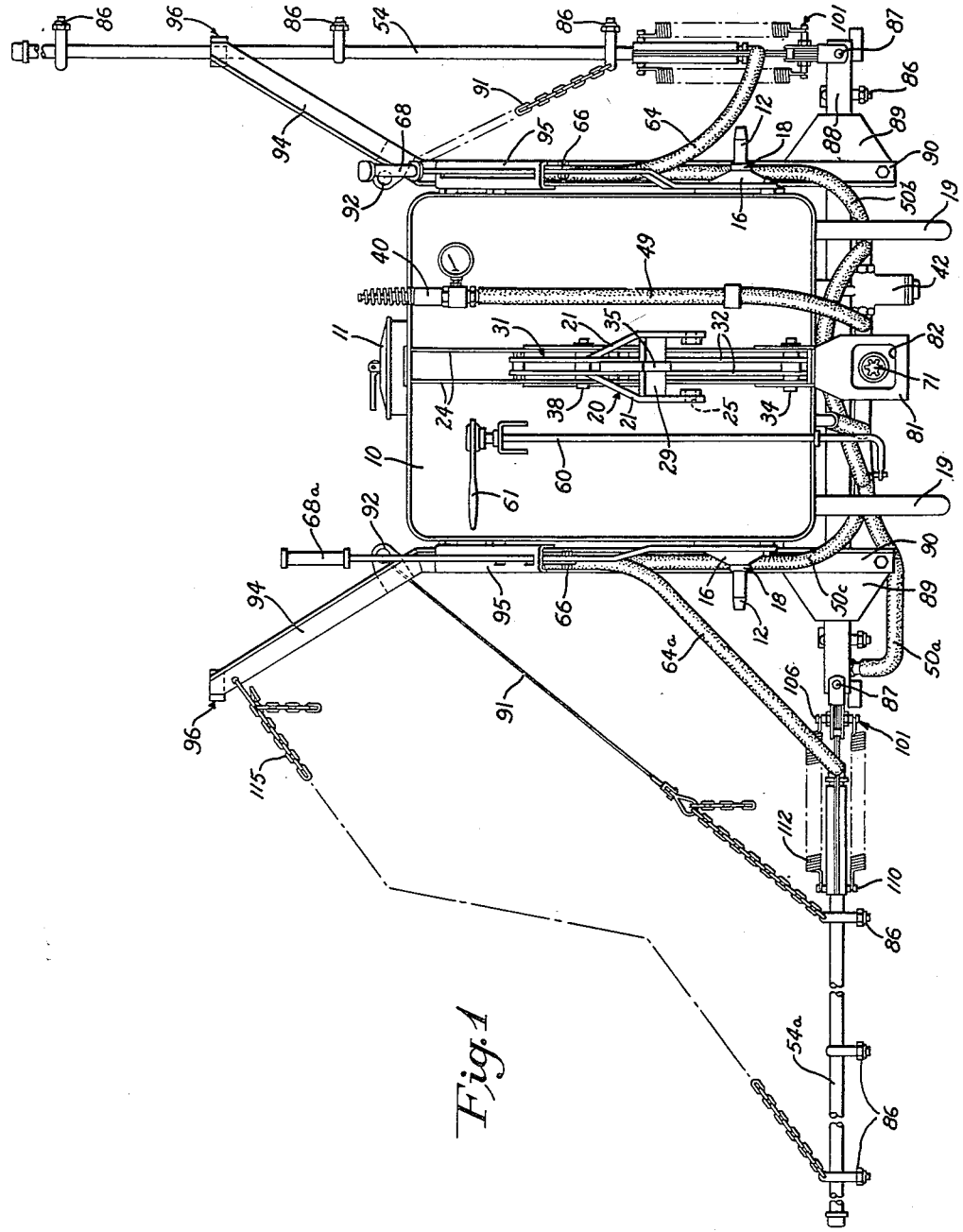
Figure 1 is a front elevation of spraying apparatus embodying the features of the invention.

The mounting means for each side boom 54 and 54a hinges the booms for independent swing between a horizontal, laterally extended working position (left side—Fig. 1) or a vertical, stowed, position (right side—Fig. 1).

The central boom 51 and the side booms 54, 54a are mounted on a frame assembly capable of vertical adjustment with reference to the tank, that is, all booms can be vertically adjusted to spray properly crops of different heights, each being provided with at least one nozzle, preferably with a plurality of spaced jets 86. This assembly (see especially Figs. 1 and 5) comprises a cross bar 88 attached at each end to brackets having back plates 89 which can be bolted at any desired height through selected holes in vertical angle members 90 attached as by welding to the sides of the tank. The central spray boom 51 is carried at its ends by supports (not visible) projecting rearwardly from the bar 88, and the side booms are pivoted by pins 87 extending horizontally fore and aft of the tractor and secured on the ends of the cross bar 88. The pins 87 receive U-shaped hinge members 93 on which the booms are mounted in a manner described below.

The mechanisms for lifting and lowering the side booms comprise the handles 68 and 68a previously referred to which are connected by lines 91 passing over pulleys 92 on extensions 94 of the vertical angles 90 and connected to the respective booms 54, 54a. The handles 68 and 68a work in slotted guides 95 and in Fig. 2 the up or "stowed" position, is shown in full lines and the lowered or "working" position in dotted lines. As previously mentioned, the corresponding shut-off cock 62 is respectively closed or opened as an incident to raising or lowering of the side booms, by means of the lost-motion links 65.

Clip means is provided to releasably secure the side booms when in stowed position. As here shown (Figs. 2 and 6), a spring clip 96 includes flared jaws 98, a retaining clip part 99, and a rear part 100 for mounting. The clip opening or jaws 98 face to the rear and the clips are strong enough to retain the booms against ordinary shocks but will release the booms in the event they catch on an obstruction during forward travel. Thus, serious damage is avoided. These clips provide a very simple safety arrangement and it will be understood that the booms are manually engaged in the clips when raised. When it is desired temporarily to lift the booms this can be done by means of the handles 68 and 68a which can be held up and then lowered again to lower the booms.

Each side boom mounting includes a self-centering two-way or safety hinge 101 to enable the booms to swing fore and aft, that, is, at right angles to the lifting hinge axis or pins 87 when the booms are either in stowed or working position. The purpose of this is to enable the booms to "break" fore or aft on encountering an obstruction either during forward or reverse travel and so avoid damage.

Each safety hinge 101 in this instance includes a fixed hinge member formed by duplex spaced bars 102 welded to the U-shaped lift hinge member 93. To these bars 102 are fixed straddling angled bars 104 by means of bolts 105 which also form hinge pins as described later. At the center of each bar 104 there projects an anchor pin 106 for a tension spring (Fig. 5). The angled ends of the bars 104 carry forwardly and rearwardly spaced alternate stop pins 108 (Fig. 2).

The movable safety hinge member on the boom includes pressed steel plates 109 welded together, between which the boom proper is clamped and by which it is carried. These plates have anchor studs 110 for the other end of the tension springs and have recesses 111 (Fig. 2) which cooperate with the alternate hinge pins 105 to form alternate hinge fulcrums on either side of the center line of the tension springs 112 attached at each side of the hinge to the studs 106 and 110 already described. A central recess 114 in the plates 109 leaves clearance for the spring studs 106.

Normally the springs 112 hold the boom hinge in the central position with bolts 105 engaged in their recesses 111. Manifestly, however, the boom can swing against the action of the springs to either side, using the fulcrum at that side formed by the respective bolt 105 and recess 111.

The stop pins 108 limit the swinging movement of the booms, the leading or forward stop pin (Fig. 2) being located somewhat nearer the boom hinge element 59 in order to limit the forward swinging action of the boom so that it will not foul the tractor rear wheel.

Should the booms encounter an obstruction when lowered, they may break fore or aft against the forces of the springs 112, permitting the tractor to be halted before damage is done. And when the booms are retained in their stowed positions by the rearwardly facing spring clips 96, they may likewise break out of the clips and swing downwardly and rearwardly should they strike an obstruction as the tractor advances.

If desired, additional brace chains or lines 115 may be hooked between the outer ends of the booms 54 and 54a and the upper ends of the extensions 94 (Fig. 1) to relieve somewhat the load on the lift lines 91. By this means the booms are more securely held in their horizontal, laterally extending positions.

From the foregoing it will be clear that spray apparatus embodying the present invention not only may be arranged as a "unit" with all necessary components mounted on the tank 10, but that the unit may be easily mounted on and lifted by the power elevatable draft links of a tractor, and latched in position to relieve the load on the power system. At the same time, the invention provides a readily disengageable drive coupling to the tractor's power take-off shaft, in a combination which prevents release of the latch so long as the coupling is engaged. The outboard booms permit spraying across a wide swath as the tractor advances and can be readily "folded" up to reduce the width of the apparatus when being driven from one working location to another. This upward folding automatically cuts off the supply of liquid to the outboard booms. Still further, the booms are mounted for safety "break out" and damage due to obstructions is substantially eliminated.

I claim as my invention:

1. For use on an agricultural tractor having power elevatable draft links pivoted at its rear end and a power take-off shaft extending rearwardly from its rear end, spraying apparatus comprising, in combination, a tank adapted to be mounted on the draft links and elevated thereby from a position at rest on the ground to a working position, a top link pivoted between the rear of the tractor and the forward face of the tank, a latch mechanism automatically engaged upon the elevation of the tank to a predetermined height and releasable upon elevating said tank above said height, a pump on the underside of said tank, a drive shaft disengageably connectable between said pump and the power take-off shaft, means for preventing elevation of said tank to release said latch mechanism when said drive shaft is connected, a spray boom pivoted to said tank to rock about a horizontal axis between vertical and horizontal, laterally extending positions, means including a cock connecting said boom to spray liquid pumped by said pump from said tank, a mechanism including a handle for rocking said boom between its vertical and horizontal positions, a lost-motion connection between said handle and said cock for closing the latter when the boom is vertical and opening it when the boom is horizontal, and a break-out hinge connecting said boom to said tank for permitting the boom to swing horizontally when it encounters an obstruction.

2. In spraying apparatus adapted for mounting on the power elevatable pivoted rear draft links of a tractor having a power take-off shaft, the combination of a liquid tank having side hitch pins insertable through the hitch links, a top link pivoted to the forward portion of said tank and adapted for pivotal connection to the rear of the tractor, the pivot connections of the draft links and top link to the tractor and tank lying in quadrilateral relation such that upon elevation of the hitch links the tank is maintained substantially level, a check link pivoted to the lower forward portion of the tank and bearing under the influence of gravity against said top link, a latch mechanism formed between said top link and check link and automatically engageable upon raising of the draft links to a predetermined position whereby said tank is supported independently of the hitch power actuating means, a pump mounted beneath said tank for discharging liquid from the latter, a drive shaft connectable between the pump and the power take-off shaft, said drive shaft including two axially telescoping members, one being socketed to fit over the power take-off shaft and spring means for releasably biasing said one member into such socketed fit, and an apertured abutment plate carried by said tank and surrounding said drive shaft to be engaged by the latter when in such socketed fit to prevent elevation of the tank or release of said latch mechanism until the drive shaft is disengaged.

3. In spraying apparatus for use on a tractor having a rear power take-off shaft and pivoted, power elevatable draft links, the combination comprising a tank pivotally mountable on said draft links, a top link adapted for pivotal connection between said tank and the rear of the tractor, means for locking said tank in elevated position including a latch member automatically engageable with said top link upon slight lowering of the tank after elevation to a predetermined height, said latch member being releasable by swinging it free of said top link after the tank is elevated slightly from the locked position, a pump on the underside of said tank, a disengageable drive shaft for connecting said pump to the power take-off shaft, and an abutment carried by the tank and disposed in the path of said drive shaft, when engaged, for preventing upward movement of said tank and release of said latch member.

4. In spraying apparatus mountable on power elevatable rear draft links of a tractor having a power take-off shaft, the combination of a spray tank adapted to be pivotally connected to said draft links, a pump mounted on the underside of said tank for discharging liquid from the latter, a flexible drive shaft having two axially telescoping parts and spring means biasing them to extended relative positions, one end of said drive shaft being drivingly connected with said pump and the other end being adapted for axial socketing with the power take-off shaft under the bias of said spring means, an abutment plate carried by said tank and having an aperture through which said drive shaft extends, whereby said draft links cannot be elevated appreciably with the drive shaft engaged due to the shaft striking the edge of said aperture, and a projection on said plate extending toward said pump for receiving the socketed end of said drive shaft when the latter is disengaged from the power take-off shaft, contracted against the force of said spring means, and withdrawn from said aperture.

5. In spraying apparatus adapted for mounting on the power elevatable draft links of a tractor having a power take-off shaft, the combination comprising a liquid tank, means for mounting said tank on the draft links for elevation therewith, means including a check link for retaining said tank in elevated position, said last-named means being releasable upon slight upward movement of said tank, a pump mounted on said tank, a drive coupling connectable between said pump and the tractor power take-off shaft, and means for preventing the aforementioned slight upward movement of said tank so long as said coupling is connected.

6. For use with a tractor having a power take-off shaft and elevatable draft links, the combination of apparatus mountable on the draft links for elevation therewith, latch means for retaining said apparatus in an elevated position, said apparatus including a power mechanism, a drive coupling connectable between said power mechanism and the tractor power take-off shaft, and means for preventing the release of said latch means so long as said coupling is connected.

7. For use with a tractor having a power take-off shaft and power elevatable draft links, spraying apparatus comprising, in combination, a liquid tank, means for removably connecting said tank to the draft links for elevation with the latter, a pump fixed to the underside of said tank and located to receive a coupling from the tractor power take-off shaft when the tank is elevated, and a downwardly projecting stand fixed to the underside of said tank to support the latter in spaced relation from the ground when removed from the draft links.

References Cited in the file of this patent

UNITED STATES PATENTS

| | | |
|---|---|---|
| 2,556,380 | Stillwagon | June 11, 1951 |
| 2,565,587 | Boyett | Aug. 28, 1951 |
| 2,608,327 | Bartling | Aug. 26, 1952 |
| 2,628,128 | Rhodeen | Feb. 10, 1953 |

FOREIGN PATENTS

| | | |
|---|---|---|
| 496,116 | Canada | Sept. 15, 1953 |